Aug. 18, 1959 W. D. HAILES 2,900,498

FAIL-SAFE PROTECTION FOR CODE COMMUNICATION CONTROL SYSTEMS

Filed Aug. 2, 1955 3 Sheets-Sheet 1

INVENTOR.
W.D.HAILES
BY Forest B. Hitchcock
HIS ATTORNEY

Aug. 18, 1959

W. D. HAILES
FAIL-SAFE PROTECTION FOR CODE COMMUNICATION CONTROL SYSTEMS 2,900,498

Filed Aug. 2, 1955

3 Sheets-Sheet 2

INVENTOR.
W.D. HAILES
BY Forest B. Hitchcock
HIS ATTORNEY

Aug. 18, 1959 W. D. HAILES 2,900,498

FAIL-SAFE PROTECTION FOR CODE COMMUNICATION CONTROL SYSTEMS

Filed Aug. 2, 1955 3 Sheets-Sheet 3

INVENTOR.
W.D. HAILES
BY
Forest B. Hitchcock
HIS ATTORNEY

United States Patent Office 2,900,498

Patented Aug. 18, 1959

2,900,498

FAIL-SAFE PROTECTION FOR CODE COMMUNICATION CONTROL SYSTEMS

William D. Hailes, Rochester, N.Y., assignor to General Railway Signal Company, Rochester, N.Y.

Application August 2, 1955, Serial No. 525,898

5 Claims. (Cl. 246—5)

Figure 1A:
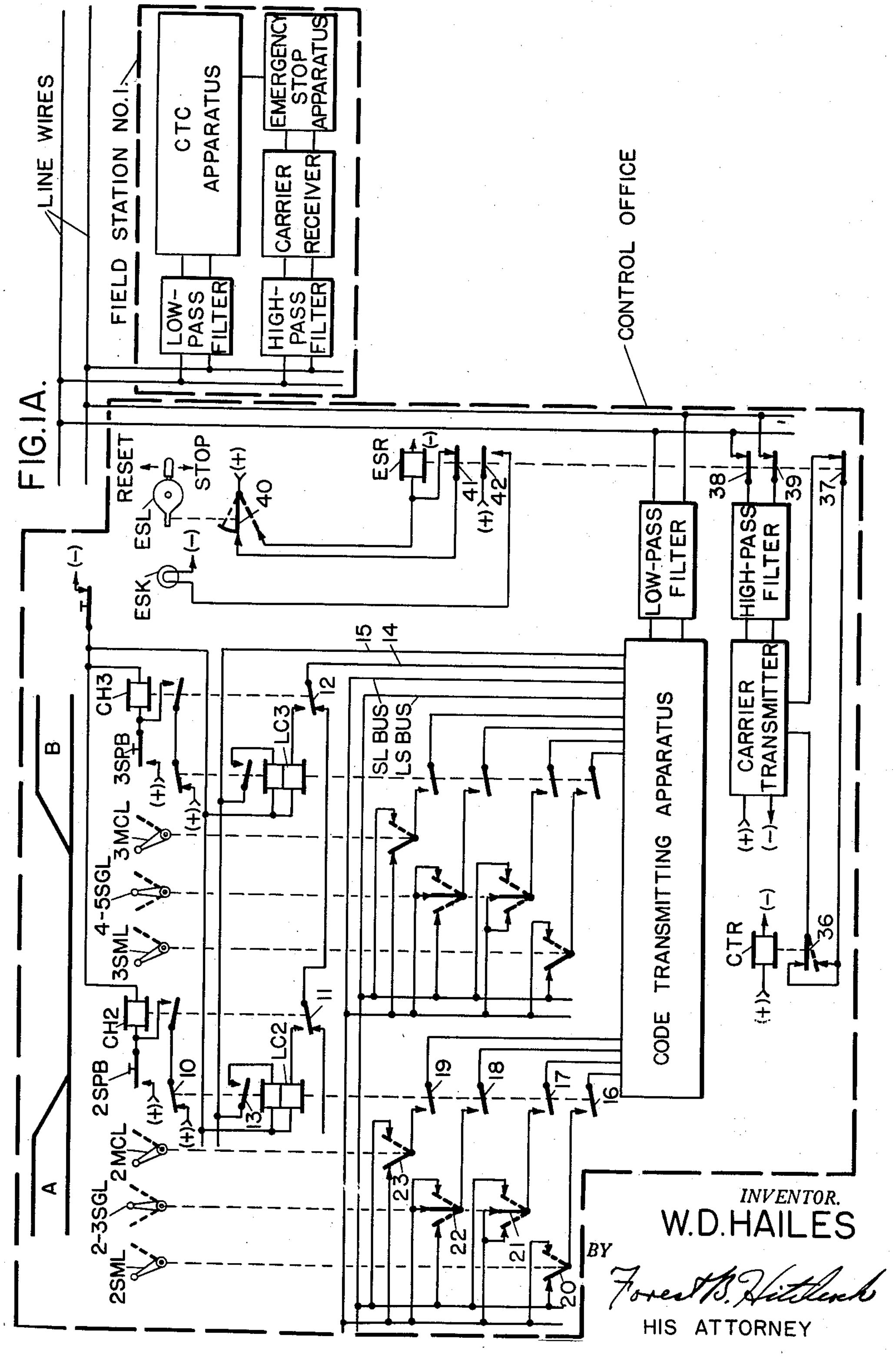

This invention relates to code communication systems and relates more particularly to code communication systems employed for controlling electroresponsive devices at remote locations from a control office. More specifically, the present invention provides means for controlling such electroresponsive devices to their respective safe, or normal, states even though a code communication system fails.

In railway signaling systems of the so-called centralized traffic control (CTC) type, for example, code communication systems are widely employed to permit the controlling of signaling devices at pluralities of field stations over a pair of line wires which connect the field stations and a central control office. The code communication apparatus is activated by manually operable control means and is caused to transmit code pulses of characters selected by such manually operable means. Receiving apparatus at the various field locations are operated in accordance with the code characters to operate signaling devices accordingly.

Once the signaling devices at a field station are operated to one of their respective operating positions in response to code transmissions, the transmission of further code pulses may be necessary to operate the signaling devices to other of their respective operating positions. Whenever a signal is operated to display a proceed aspect, for example, provisions are made for causing the signal to display a stop aspect when a train passes the signal and occupies the block governed by the signal. If however, it becomes necessary to require the signal to display a stop aspect before the arrival of any trains, the signal must be operated to its stop position by the transmission of manually selected code characters. Thus, if the code communication apparatus should fail, or if the line wires should be broken or shunted, code energy could be prevented from reaching particular field stations, thereby rendering the control office ineffective in governing particular signals. Therefore, it is desirable to provide means by which signals can be remotely controlled to display their stop aspects even though the code communication system regularly employed to effect this control is ineffective for any reason.

The present invention, as applied to railway signaling systems, proposes the use of a separate communication channel between the control office and the field stations for the purpose of rendering any signals operable to their respective stop positions under any conditions. More specifically, it is proposed that transmitting means be provided at the control office for transmitting carrier energy of a particular frequency and character, distinguishable from any frequencies utilized in the code communication system. Receiving means responsive to energy of this carrier frequency only is provided at each field station. It is proposed that the carrier transmitting means be normally active and that circuit means responsive to the reception of carrier energy by the receiving means at each field station be provided for permitting any associated signals to display proceed aspects only when the carrier energy is being received. Since the carrier energy may be transmitted via the line wires used in the code communication system, a failure of this line circuit due to an open-circuit or a short-circuit can be expected to restrict the flow of carrier energy beyond the fault in the line circuit. It may be that all signals beyond the fault will be caused to display their stop aspects automatically as a result of the line fault. However, a line fault may permit the passing of considerable carrier energy while preventing the proper operation of the coded control system. Therefore, a manually operable means can be provided at the control office for removing carrier energy from the line wires at the control office and thus produce the control desired irrespective of the effects of the line fault. In this manner, an over-control means is provided whereby the operator at the control office can operate signals to their stop positions under any conditions.

As the description of the present invention progresses it will be evident that this invention can be utilized in conjunction with many control systems of the code communication type; and such code communication systems may be of the radio communication type which do not employ line circuits. In order to describe the present invention, however, it will be assumed that a coded railway control system of the type described in the U.S. Patent No. 2,399,734 of W. D. Hailes et al., dated May 7, 1946, is employed.

In view of the preceding considerations, an object of this invention is to provide means for causing railway signals or other electroresponsive devices controlled by means of a code communication system to be operable to particular operating positions even though the code communication system is rendered inoperative, such operating positions being predetermined in accordance with safety requirements.

Other objects, purposes and characteristic features will be in part evident from the accompanying drawings, and in part pointed out as the description of the invention progresses.

Figure 1B:
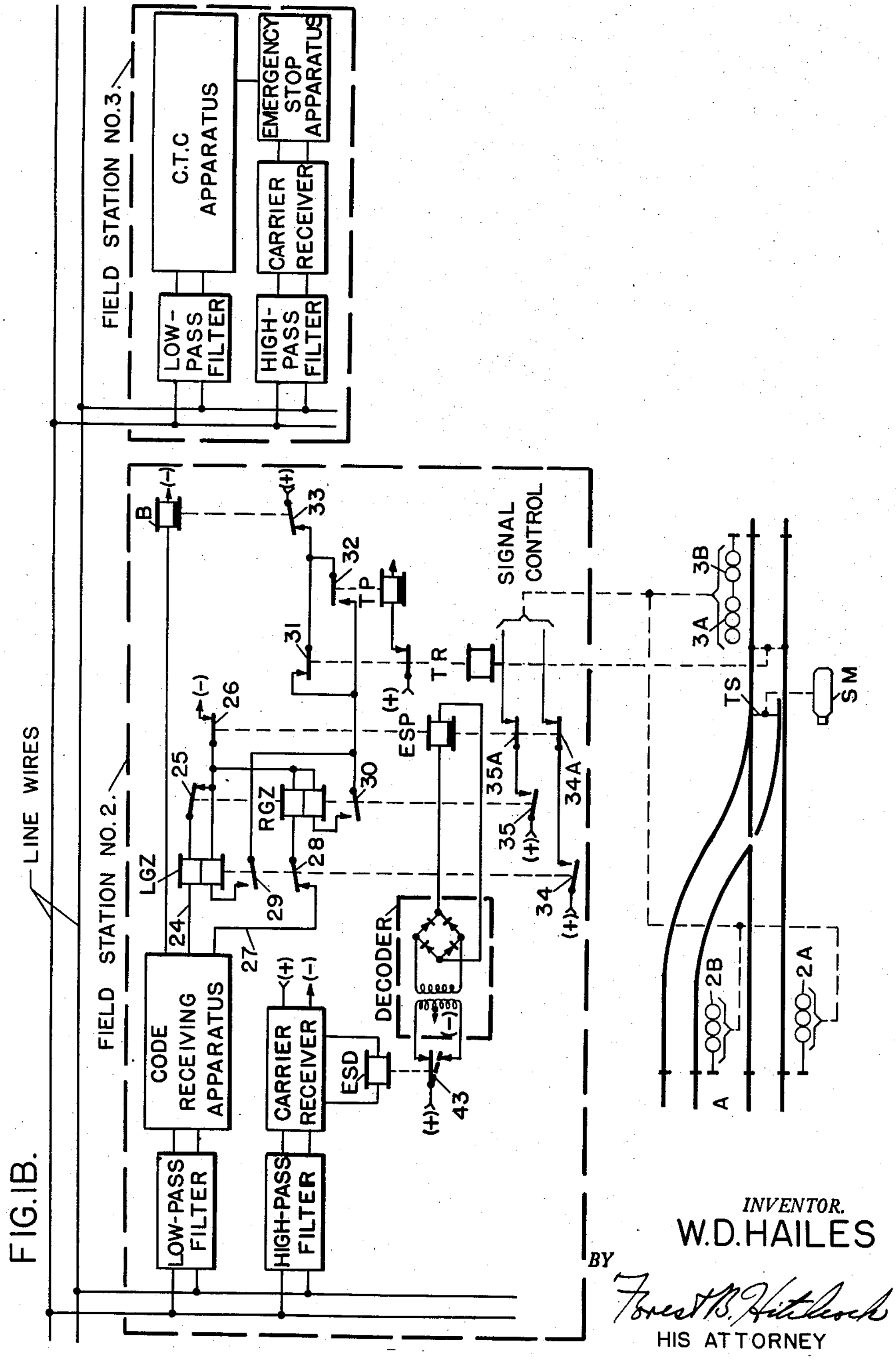
Figure 2:
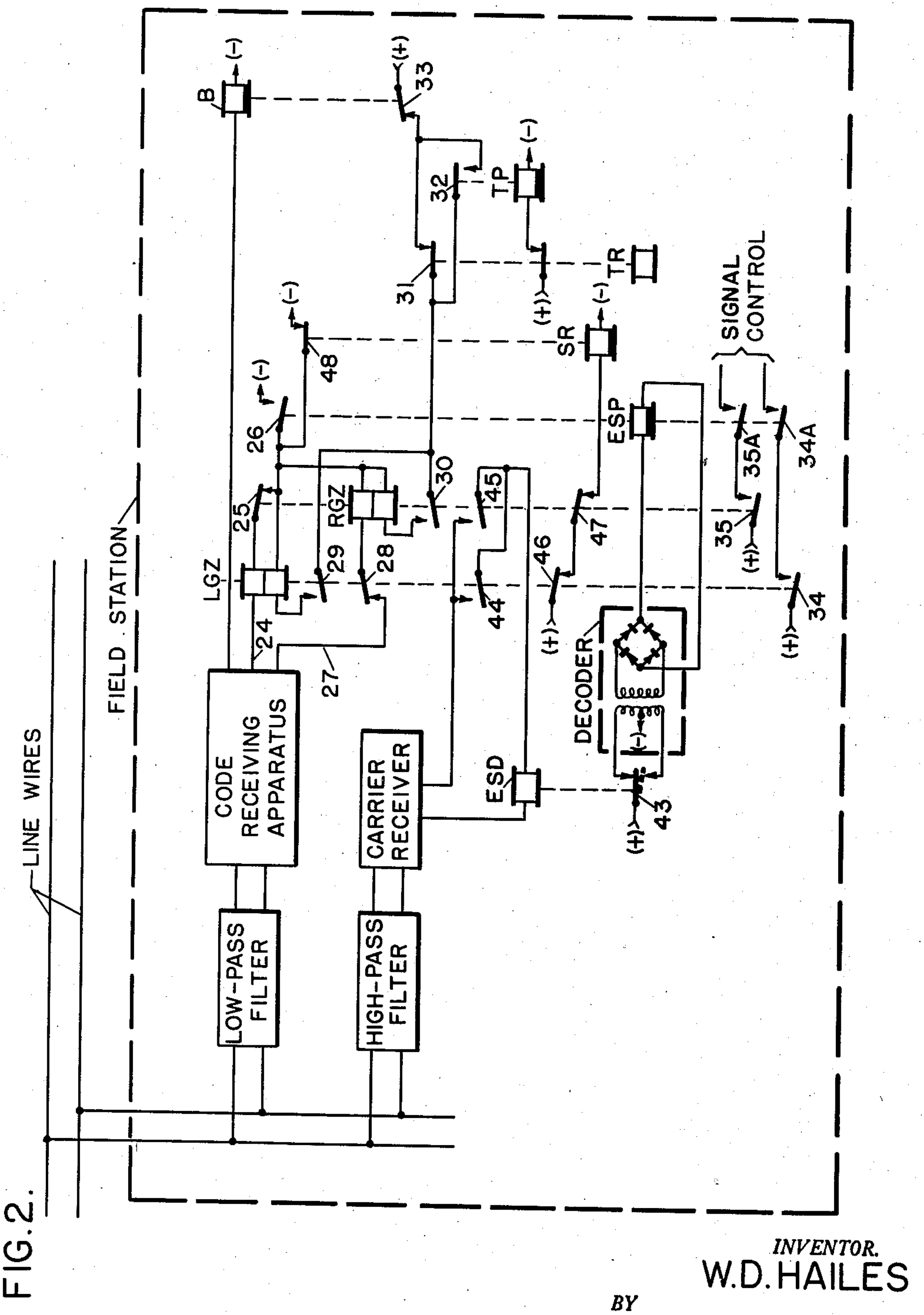

In the accompanying drawings:

Figs. 1A and 1B show diagrammatically one embodiment of the present invention in conjunction with a railway code communication signaling system connecting a control office and a plurality of field stations; and Fig. 2 shows diagrammatically a modified form of the field station apparatus shown in Figs. 1A and 1B.

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and their contacts are illustrated in a conventional manner, and symbols are used to indicate connections to the terminals of batteries, or other sources of electric current, instead of showing all of the wiring connections to these terminals.

The symbols (+) and (—) are employed to indicate the positive and negative terminals, respectively, of suitable batteries, or other sources of direct current; and the circuits with which these symbols are used, always have current flowing in the same direction.

In describing one form of the present invention, it is assumed that this invention is utilized in conjunction with a railway code communication signaling system which is essentially identical to that described in the U.S. Patent No. 2,399,734 of W. D. Hailes et al., dated May 7, 1946. Figs. 1A and 1B in the accompanying drawings, therefore, show either in block form or in detail the essential components of the system disclosed in the aforesaid patent of Hailes et al. for controlling signaling devices at a plurality of remote field stations located along a section of trackway which includes a plurality of passing siding locations. Subsequent descriptions of the operation of the code communication signaling system will be general, the description in the Hailes et al. patent being relied upon for specific details of the system operation.

As in the Hailes et al. patent it is assumed that a stretch of railway track including passing sidings A and B (see Figs. 1A and 1B) is under the jurisdiction of a control office. Each siding is assumed to have an associated track switch and a plurality of signals. At siding A, for example, a track switch TS is shown and is assumed to be operable by a power-operated switch machine SM; and signals 2A, 2B, 3A and 3B are provided for governing trains. Near each siding location a field station is provided for housing control circuit means for operating relevant switch machines and signals. Field stations No. 2 and No. 3 are respectively associated with the sidings A and B, while field station No. 1 is assumed to be associated with an interlocking location (not shown) located between the control office and siding A. Since all of the field stations can be assumed to be essentially identical insofar as their respective essential control circuit means are concerned, the apparatus located at field stations No. 1 and No. 3 are shown in block form while the apparatus at field station No. 2 is shown in greater detail.

A control machine panel located in the control office is assumed to include levers for selectively operating the various switch machines and signals. A switch machine lever 2SML, a signal lever 2–3SGL and a maintainer call lever 2MCL are provided for controlling apparatus at field station No. 2; and similar levers 3SML, 4–5SGL and 3MCL are provided for controlling apparatus at field station No. 3. The switch machine levers are of the two-position type, each position being associated with a respective track switch position. Each signal lever is of the three-position type and is normally placed in the center position to call for the displaying of stop indications by all of the associated signals. When moved to either the right-hand or the left-hand position, each signal lever calls for the displaying of a proceed indication by an associated signal governing traffic moving either to the right or the left, respectively.

The control office code communication apparatus, when activated, causes the transmitting of series of spaced code pulses having characters determined by lever positions. In each series, or stepping cycle, a particular field station as well as particular signaling apparatus is called for selectively. When signaling apparatus associated with field station No. 2 is to be controlled, levers 2SML, 2–3SGL and 2MCL are positioned as required and a start push button 2SPB is depressed. A change relay CH2 is then energized resulting in the activation of the control office apparatus. An obvious stick circuit for relay CH2 includes back contact 10 of a code determining relay LC2 which identifies field station No. 2 as being the station to receive control codes. The code determining relay LC2, along with other LC relays which are identified with other respective field stations, is included in a chain-type pick-up circuit arrangement which prevents the concurrent energization of more than one LC relay at any time. For example, when front contact 11 of relay CH2 closes in the pick-up cricuit for relay LC2, relay LC2 can be energized only if relay LC3 is deenergized closing its back contact 12. Once energized, relay LC2 is held energized by a stick circuit including its stick contact 13. Pick-up and stick energies for the LC relays are indicated as being supplied by the code transmitting apparatus via wires 14 and 15, respectively. When relay LC2 is energized it causes the deenergization of the change relay CH2; and relay LC2 remains energized throughout the duration of the code transmitting cycle.

The character of a code to be transmitted on each step is determined by the energization of either a relay LS or a relay SL (not shown); and buses for selectively energizing these relays are shown. As a stepping relay bank included in the control office apparatus performs a stepping cycle of operation, a plurality of channels are energized singly and in sequence. Connected to these step channels are contacts 16, 17, 18 and 19 of relay LC2; and similar contacts of relay LC3 are also assumed to be connected to like step channels. Contact 20 of lever 2SML, contacts 21 and 22 of lever 2–3SGL and contact 23 of lever 2MCL are, in turn, connected to contacts 16–19, respectively, of relay LC2; and similar lever contacts for controlling apparatus at field station No. 3 are connected to the step channels through contacts of relay LC3. The various lever contacts, in turn, are connected to the SL and LS buses. Thus, on each step in a particular cycle either relay LS or relay SL is energized in accordance with the state of the LC relays and the position of a particular lever. In controlling switch TS at field station No. 2, for example, energy is supplied to either the SL or LS bus in accordance with the position of contact 20 of lever 2SML, provided that front contact 16 of relay LC2 is closed, when the associated step channel is energized.

Code energy is applied to the line wires by the control office transmitting apparatus through a low-pass filter. The filter acts to permit the passage of the code pulses, while barring the passage of other energies, such as carrier or telephone, which may be applied to the line wires.

At the field stations, code energy pulses are received by receiving apparatus which is included in the CTC system. A low-pass filter is utilized at each field station to pass code pulses while barring other line energies, such as carrier or telephone, which may be applied to the line wires. The receiving apparatus at field station No. 2, for example, includes a stepping relay bank (not shown) which is caused to perform step-by-step operations in response to code pulses transmitted from the control office. On each step of an operating cycle at the field station, an application relay (not shown) is energized in accordance with the character of a code received on that step. At the end of the code transmission cycle a so-called execution period is in effect, wherein particular control relays are operated in accordance with the condition of the code-operated application relays. At this time the signal control relays LGZ and RGZ, for example, are selectively energized in accordance with the conditioning of the field application relays. If a control code called for the clearing of a signal governing traffic to the left, relay LGZ becomes energized by a pick-up circuit including wire 24, back contact 25 of relay RGZ and front contact 26 of relay ESP. The clearing of signals governing traffic to the right requires that relay RGZ be energized by a pick-up circuit including wire 27, back contact 28 of relay LGZ and front contact 26 of relay ESP. Relays LGZ and RGZ are provided with stick circuits which include their respective front contacts 29 and 30; and these stick circuits include either front contact 31 of a track relay TR or back contact 32 of a track repeater relay TP, and back contact 33 of relay B. Contacts 34 and 35 of relays LGZ and RGZ, respectively, are assumed to be included in signal control circuits for operating the various signals, such control circuits being well-known in the art.

Relays LGZ and RGZ are selectively energized at the end of a code transmission cycle; and the subsequent returning of the core communication apparatus to a state of rest removes energy from the respective pick-up circuits for relays LGZ and RGZ. Either relay is then dependent on its stick circuit for continued energization. When the track circuit at siding A is occupied by a train accepting a proceed indication, relay TR releases its armature and opens the stick circuit for either relay LGZ or RGZ. This well-known practice of including track relay contacts in signal control relay circuits causes the automatic cancellation of signal-clear calls after the signal is passed by a train. Whenever it is desirable to cancel a signal-clear condition by control means the control machine operator must initiate the transmission of a control code cycle in which a signal-stop control is transmitted. Such a controlled operation results in the energization of relay B at field station No. 2, for example, and back contact 33 of relay B opens the stick circuits for relays LGZ and RGZ, thereby causing the associated signals to be operated to display stop aspects.

At the control office a carrier transmitter, or oscillator, is provided. The carrier transmitter is assumed to be normally energized and is assumed to supply output energy of a particular frequency; and this carrier frequency is assumed to be high, relative to the frequencies of control code energies. The carrier energy frequency is further assumed to be distinguishable from the frequencies of any other energies applied to the line circuit. The carrier transmitter is assumed to be keyed by a keying circuit including contacts 36 and 37 of relays CTR and ESR, respectively.

Relay CTR is assumed to be a code transmitter of the well-known type which, when energized, continuously opens and closes its contacts. Thus, contact 36 of relay CTR alternately opens and closes the keying circuit for the carrier transmitter, the result being that the carrier transmitter output consists of energy pulses each having the frequency characteristics determined by the carrier transmitter. The reason for this mode of operation will be described later.

Carrier energy is applied to the line wires through a high-pass filter which is capable of passing only energy of the carrier frequency. Front contacts 38 and 39 of relay ESR are included in the output circuit of the carrier transmitter for the purpose of disconnecting the carrier transmitter from the line circuit when required.

Relay ESR is an emergency stop relay which functions to apply or remove carrier energy. This relay is assumed to be normally energized through a three-position emergency stop lever ESL which is assumed to be spring-biased to assume its center position. Under normal conditions the lever ESL is in its center position, closing its contact 40 in a stick circuit for relay ESR; and this stick circuit includes front contact 41 of relay ESR. When lever ESL is moved manually to its Stop position, the movable portion of contact 40 opens the stick circuit for relay ESR. Front contacts 38 and 39 of relay ESR open to disconnect the carrier transmitter from the line circuit. In order to preclude the possibility that carrier energy may bridge the open contacts 38 and 39 of relay ESR, front contact 37 of relay ESR opens the previously described keying circuit for the carrier transmitter, thereby interrupting the operation of the transmitter. A subsequent returning of lever ESL to its center position does not affect the deenergized state of relay ESR. When the carrier energy is to be returned to the line circuit, lever ESL is moved to its Reset position, and the movable portion of contact 40 makes contact with both the center and lower fixed contact points. Thus, relay ESR is energized by a pick-up circuit through the lower contact point of contact 40; and the stick circuit for relay ESR is closed by contact 40 as long as lever ESL is in either its center or Reset positions.

An emergency stop indication lamp ESK is provided to indicate that relay ESR is deenergized; and the energizing circuit for the lamp ESK includes back contact 42 of relay ESR.

A carrier receiver is provided at each field station for detecting the presence of carrier energy. At field station No. 2, for example, carrier energy present in the line circuit is applied to a carrier receiver through a high-pass filter which is built to pass the carrier frequency. Carrier energy activates the carrier receiver which, in turn, energizes an emergency stop detector relay ESD. Since carrier energy is supplied in pulses from the control office, relay ESD is alternately energized and deenergized.

Whenever relay ESD is operating, (+) energy is applied intermittently to a decoder by contact 43 of relay ESD. The decoder is assumed to be of the well-known type which includes a transformer and a full-wave rectifier. The front and back contact points of contact 43 of relay ESD are connected to respective extremities of the primary winding of the transformer, while the center of the primary winding is connected to (−) energy. Thus, when relay ESD is operating in response to energy pulses, contact 43 of relay ESD causes successive reversals in the direction of the magnetic flux in the transformer core. Resultant induced voltages appear across the terminals of the secondary winding; and the secondary terminals are connected to a rectifier. The output terminals of the rectifier are connected to the winding of the emergency stop repeater relay ESP. The rectifier then acts to rectify the alternating voltage induced in the secondary winding, thereby applying energy pulses of uniform polarities to the winding of relay ESP. Relay ESP is assumed to be slow-acting in releasing its armature, and is capable of picking up and retaining its armature when energized by pulsating energy.

Whenever carrier energy fails to reach field station No. 2, relay ESD is deenergized. Steady energy is applied to the primary winding of the decoding transformer; and steady energization does not result in the inducing of a voltage in the secondary winding. Relay ESP is therefore deenergized when carrier energy is not received at field station No. 2. Similarly, relay ESP will be deenergized if relay ESD should remain steadily in the picked up position. Thus, it is necessary that coded carrier energy reach the field location in order to hold relay ESP in its energized position.

As previously described, both the pick-up and stick circuits for relays LGZ and RGZ include front contact 26 of relay ESP. Therefore, the absence of carrier energy always causes the deenergization of the signal control relays LGZ and RGZ.

Although the deenergization of relay ESP can cause the deenergization of the signal control relays LGZ and RGZ, as described, it can be desirable to include contacts of relay ESP in the actual signal control circuits. In this manner, the emergency operating of signals to display stop aspects is made independent of abnormal conditions of any sort which might exist in the application relay circuits. In Fig. 1B, therefore, front contacts 34*a* and 35*a* of relay ESP are shown in series with the respective front contacts 34 and 35 of relays LGZ and RGZ, respectively.

In the system, as described, it is evident that carrier energy could be steadily applied to the line circuit, thereby eliminating the code teransmitting relay CTR at the control office and the decoding apparatus at the field stations. However, in practice it is possible that stray electrical energy may cause inductive interference great enough to cause relay ESD to be held steadily in its energized position. Therefore, the use of coded (pulsed) carrier energy is used to avoid unauthorized operation of the safety provisions by foreign or stray energy. In the system described, the application of steady energy from an external source could result in the steady energization of relay ESD. A steady current rather than a pulsating current would then flow in the primary winding of the decoding transformer; and no voltage could be induced in the secondary winding of the transformer to pick up relay ESP.

It is to be understood that increased integrity can be obtained by employing a carrier code of a very particular character as, for example, 180 pulses per minute in conjunction with a detection means that is responsive to this code only.

The emergency stop circuit means at each field station is required to be operable only when any signal associated with each station is operated to display a proceed indication. The circuit arrangement previously described for field station No. 2 (Fig. 1B) can be modified to assume the form shown in Fig. 2; and like reference characters are used in Fig. 2 wherever the circuits are identical to those in Fig. 1B.

In Fig. 2 the emergency stop detection relay ESD is provided with a pick-up circuit which includes either front contact 44 of relay LGZ or front contact 45 of relay RGZ. Therefore, relay ESD cannot respond to pulses of carrier energy received by the carrier receiver unless a signal clearing control has been received and has resulted in the energization of one of the signal control relays LGZ or RGZ. In this manner relay ESD is called upon to operate only when required. Under these conditions, contact 43 of relay ESD causes the steady energization of the primary winding of the decoding transformer; and, as previously described, relay ESP cannot be energized under such conditions. Whenever relay ESP is deenergized, its front contact 26 opens both the pick-up and stick circuits for relays LGZ and RGZ. A slow release relay SR is provided, therefore, to permit the energization of either of the signal control relays under normal conditions. Relay SR is energized by a pick-up circuit including back contacts 46 and 47 of relays LGZ and RGZ, respectively. Thus, relay SR is energized only when no signal clearing codes have been received. Front contact 48 of relay SR is connected in parallel with front contact 26 of relay ESP to provide closed pick-up circuits for relays LGZ and RGZ.

Relay SR is assumed to be slow-acting in releasing its armature so that relay LGZ or relay RGZ can be maintained energized until relay ESP can be energized. In other words, as soon as either relay LGZ or RGZ is energized in response to control codes, the pick-up circuit for relay SR opens and the pick-up circuit for relay ESD closes. It is evident that relay ESD must then operate for a particular time interval before sufficient voltage builds up in the secondary winding of the decoding transformer to pick up relay ESP. Therefore, relay SR should not release its armature and open its front contact 48 in the energizing circuits for relays LGZ and RGZ until front contact 26 of relay ESP closes.

The over-control means provided by the emergency stop lever ESL is capable, when operated as described, of causing all of the signals associated with all of the field stations to be operated to their stop positions even though the regular code communication system has failed. Obviously, situations can arise in practcie whereby it is undesirable to cause all signals to display stop aspects when only the signals at a particular field station are required to be so controlled. Therefore, pluralities of carrier transmission apparatus and associated emergency stop levers can be provided, each field station or group of stations being assigned and equipped to respond to a carrier of particular character and frequency. Manually initiated emergency stop operations can thereby be confined to particular locations. This feature is of particular value when the failure of the code communication system is due to apparatus rather than line wire trouble. It is also more effective than a single frequency overcontrol if the code communication system is operated by radio rather than over line wires. In this case, the overcontrol channel can be independent of the channel for code communication.

The preceding descriptions of circuit operation have assumed that the emergency stop means is effective only for causing signals to display stop indications. It should be evident that the emergency stop controls can also be applied to track switches, derails, or any other apparatus. For example, if it is assumed that it is desired to operate a derail to a particular position even though the code communication system has failed, the emergency stop means can be employed to operate the derail to the particular safe position.

It is evident that the code communication system assumed in describing the operation of the present invention transmits codes in the form of spaced pulses of direct current energy. Other control systems used in general practice transmit codes in the form of steady energy or pulses of energy; and such energies do not have to be of the direct current type, but may have particular frequencies. The present invention can be employed with any of such systems as long as the frequency of the overcontrol carrier energy differs from and can be distinguished by means of filtering devices, from the code communication energy frequencies. It is further evident that the present invention is also adaptable for use with code communication systems of the radio frequency type which do not employ line wires.

Having described a fail-safe protection means for code communication type control systems as one specific embodiment of the present invention, it is desired to be understood that this form is selected to facilitate in the disclosure of the invention rather than to limit the number of forms which it may assume; and it is to be further understood that various modifications, adaptations and alterations may be applied to the specific form shown to meet the needs of practice, without departing in any manner from the spirit or scope of the present invention.

What I claim is:

1. A system for operating traffic control devices at a plurality of remote field stations from a single control office comprising, traffic control devices at each field station for displaying stop and proceed indications, normally inactive code communication apparatus of the step-by-step type connecting the control office and each said field station for selectively controlling the display of each said traffic control device in accordance with manually initiated code signals, over-control means including a normally active transmitter at the control office for normally continuously transmitting a separate carrier signal of distinctive frequency and manually operable switching apparatus for deactivating said transmitter, carrier receiving means at each said field station responsive to said separate and distinctive carrier signal, and emergency control means at each said field station responsive to said carrier receiving means for controlling said traffic control devices to display proceed indications when and only when said separate and distinctive carrier signal is being received by said carrier receiving means.

2. A system for controlling railway signals at a plurality of remote field stations from a single control office comprising, a normally inactive direct current code communication system of the step-by-step type having code transmitting means at the control office and code receiving means at each remote field station, line wires connecting said code transmitting means to said code receiving means, said code communication system being capable when rendered active of transmitting over said line wires a series of distinctive pulses selected to comprise a code for selectively controlling traffic control signals at each said field station to display either stop or proceed aspects, manually operable control means at the control office for activating said code communication system and for selecting different pulses for the code to be transmitted, normally active carrier transmitting means located at the control office for normally continuously transmitting over said line wires distinctive carrier energy of a particular frequency, carrier receiving means located at each said field station for receiving said distinctive carrier energy, signal control circuit means at each said field station responsive to said code receiving means and said carrier receiving means for selectively controlling said traffic control signals in response to the particular codes received by said code receiving means, said control circuit means being capable of causing any said traffic signals to display proceed indications when and only when said distinctive carrier energy is being received by said carrier receiving means.

3. A system for operating traffic control devices at a plurality of remote field stations from a single control office comprising, at each field station traffic control devices for displaying stop and proceed indications and signal circuit means for producing selective output signals for controlling said indications, normally inactive code communication means of the step-by-step type connecting the control office and each field station for selectively controlling said signal circuit means, normally active transmitting and receiving means located respectively at the control office and at each said field station for the normally continuous transmission and reception of a separate carrier signal of distinctive frequency, manually operable over-control means at the control office for deactivating said separate carrier signal, emergency control means at each said field station responsive to said separate carrier signal for controlling said selective output signals of said signal circuit means, said selective output signals causing said traffic control devices to display proceed indications in response to said code communication means when and only when said distinctive carrier signal is being received, and energy saving means at each field station responsive to said code communication means for deactivating said emergency control means when and only when all said traffic control devices are displaying stop indications.

4. A system for controlling traffic signals at a plurality of remote field stations from a single control office comprising, normally at rest code communication apparatus connecting the control office and each remote field station, said code communication apparatus having code transmitting means located at the control office capable of transmitting pulses of direct current and code receiving means located at each said field station capable of receiving said pulses, manually operable control means at the control office for activating said code transmitting means and for selectively determining the characters of the pulses to be transmitted, normally active carrier transmitting means at the control office for normally continuously transmitting separate carrier energy of a particular frequency, carrier receiving means at each said field station responsive to said separate carrier energy, manually operable over-control means at the control office for rendering said carrier transmitting means inactive, an emergency stop relay at each said field station, circuit means responsive to the activation of said carrier receiving means for energizing said emergency stop relay, control circuit means at each said field station for selectively controlling traffic control signals in accordance with the character of the pulses received by said code receiving means when and only when said emergency stop relay is in the energized position, and emergency stop circuit means responsive to the deenergized condition of said emergency stop relay for causing said traffic control signals to assume traffic-safe conditions.

5. A code communication system of the step-by-step type for controlling traffic control devices at a plurality of remote field stations from a single control office comprising, code communication apparatus including code transmitting means and code receiving means located, respectively, at the control office and at each remote field station, said code communication apparatus being capable when activated of transmitting a series of distinctive pulses selected to comprise a code for selectively controlling proceed and stop aspects displayed by traffic control devices located at each said field station, manually operable control means at the control office for activating said code communication apparatus and for selectively determining the character of codes to be transmitted, separate carrier transmitting and receiving means located, respectively, at the control office and each field station for effecting the transmission and reception of distinctive carrier energy of a particular frequency, a normally operative code transmitter relay at the control office, circuit means including contacts of said code transmitter relay for periodically activating said separate carrier transmitting means, an emergency stop detector relay at each said field station responsive to the reception of said distinctive carrier energy by said carrier receiving means, a slow-acting emergency stop repeater relay, decoding circuit means for energizing said emergency stop repeater relay in response to operations of said emergency stop detector relay resulting from the reception of said periodically transmitted distinctive carrier energy, a stop relay, control circuit means responsive to said code receiving means for deactivating said emergency stop detector relay and for activating said stop relay when said tranffic control devices are all controlled to display stop aspects, said code receiving means being responsive to said distinctive code pulses only when said emergency stop repeater relay is energized or when said stop relay is energized, said control circuit means being capable of causing said traffic control devices to display proceed aspects when and only when said emergency stop repeater relay is in the energized position.

References Cited in the file of this patent

UNITED STATES PATENTS

| | | |
|---|---|---|
| 2,153,518 | Hailes | Apr. 4, 1939 |
| 2,399,734 | Hailes | May 7, 1946 |
| 2,399,738 | Howe | May 7, 1946 |
| 2,413,296 | Deal | Dec. 31, 1946 |
| 2,554,000 | Baughman | May 22, 1951 |
| 2,564,766 | Oberman | Aug. 21, 1951 |
| 2,647,993 | Ziffer | Aug. 4, 1953 |